No. 760,589. PATENTED MAY 24, 1904.
W. T. VALLANDINGHAM.
FLOUR SIFTER.
APPLICATION FILED JUNE 18, 1902.
NO MODEL.
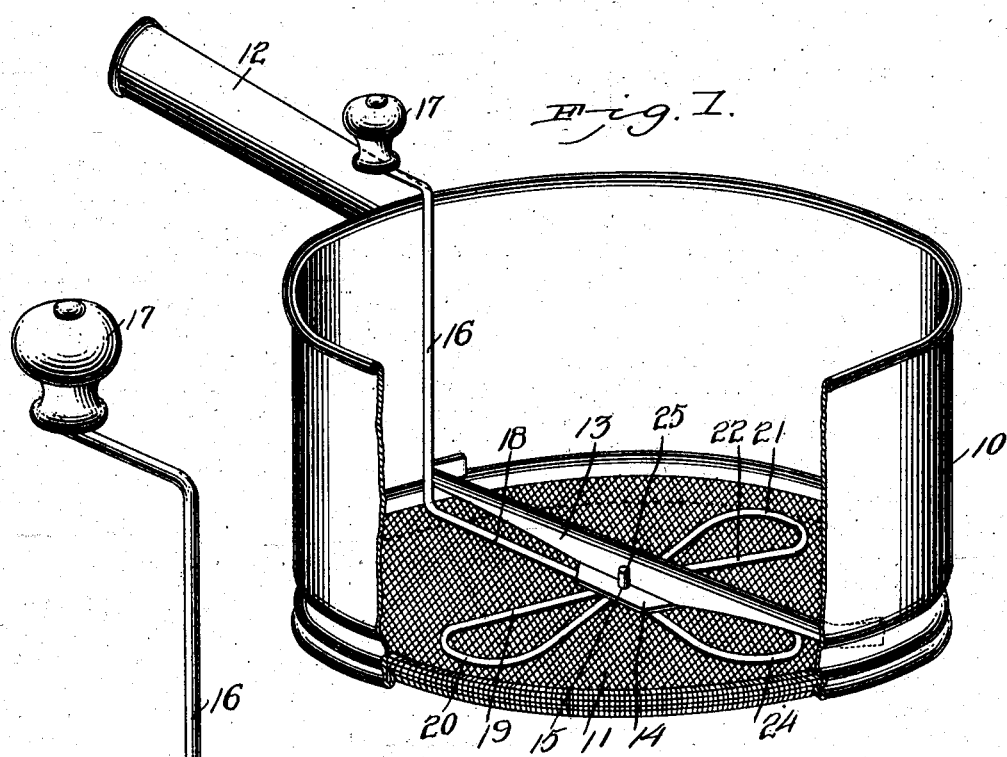
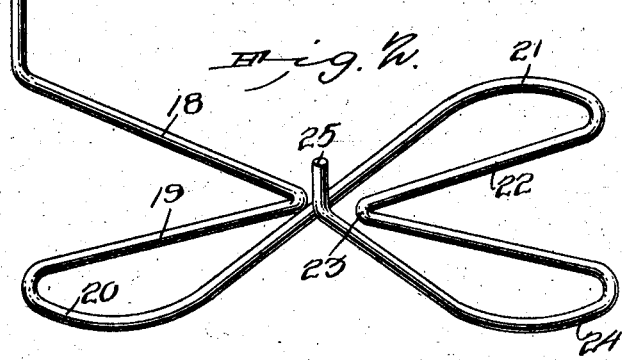
Witnesses
E. F. Stewart
C. N. Woodward
W. T. Vallandingham, Inventor
by C. A. Snow & Co.
Attorneys No. 760,589. Patented May 24, 1904.

UNITED STATES PATENT OFFICE.

WILLIAM T. VALLANDINGHAM, OF ALBIA, IOWA.

FLOUR-SIFTER.

SPECIFICATION forming part of Letters Patent No. 760,589, dated May 24, 1904.

Application filed June 18, 1902. Serial No. 112,234. (No model.)

*To all whom it may concern:*

Be it known that I, WILLIAM T. VALLANDINGHAM, a citizen of the United States, residing at Albia, in the county of Monroe and State of Iowa, have invented a new and useful Flour-Sifter, of which the following is a specification.

This invention relates to improvements in flour-sifters for domestic use, and has for its object the production of a simple and cheaply-constructed device in which the fine particles of flour will be separated from the coarser particles, the coarser particles pulverized, and the foreign matter separated from the flour or other products; and the invention consists in certain novel features of the construction, as hereinafter shown and described, and specified in the claim.

In the drawings illustrative of the invention, Figure 1 is a perspective view, with a portion of the side broken away to illustrate the interior construction. Fig. 2 is a perspective view of the agitator detached.

The sifter consists of the cylindrical body portion 10, having the flat screen-bottom 11, and with a handle 12 extending from one side. The shell 10 may be of any desired size both as to diameter and length, but will generally be of the size usually employed in devices of this character.

Supported across the shell 10 on the interior just above the screen-bottom 11 is a vertical bar 13, having a central lateral offset 14, provided with an aperture 15, the bar being so set that the aperture will come in the center of the shell 10.

The agitator is preferably formed of a single piece of wire consisting of a vertical section 16, disposed parallel with and adjacent to the inner face of the walls of the shell 10 and in contact therewith and having an outwardly-turned upper end provided with an operating-handle 17 and turned inwardly at its lower end at 18 and extending nearly to the center of the shell and parallel with and in close proximity to or in positive engagement with the upper surface of the screen-bottom, as shown. At its inner end the section 18 is turned outward at 19 and extends nearly to the inner surface of the shell and is then looped around at 20 and extended backward again beneath the bar 13 and nearly to the opposite side of the shell and curved around again at 21 and carried backward, as at 22, nearly to the center of the shell again, as at 23, and thence outward again in substantial alinement with the section 18 nearly to the shell midway between the points 20 and 21, as shown at 24, and thence backward again and turned upward at the end and terminating at 25 in a vertical stud adapted to engage the aperture 15, as indicated in Fig. 1. The loops 20 21 are at right angles to the section 18, and the loop 24 is midway between the loops 20 and 21 and opposite the section 18, as will be noted by reference to Fig. 2. By this means the agitator is formed with three equidistant wings lying in the same plane horizontally and adapted to be oscillated by the handle 17 upon the vertical stud 25 as a center, in close engagement with the screen material, the section 16 operating as a scraper to cut the flour from the walls of the sifter and also to pulverize the lumps which come between it and the shell. By this simple means the agitator lies loosely upon the upper surface of the screen material and is held in engagement therewith by the bar 13 and its offset 14, and the action of the handle 17 causes the material which is to be separated to be thoroughly agitated and screened, the lumpy particles pulverized or separated from the finer particles, and all foreign matter also efficiently separated from the finer matter and retained in the shell.

The open-loop form of the agitator greatly increases the efficiency of the device, as by this means pockets or receptacles are formed in which the particles gather and are carried around over the surface of the screen material back and forth as the agitator is operated and thus hold them in engagement with the screen material and exert a strong pulverizing effect upon them.

It will be noted that the handle 17 extends over the handle 12 of the screen and lies when not in use in alinement therewith, so that when the device is employed as a scoop or when filling the shell 10 the handle will not be in the way of the operator, but will be within reach of the thumb of the operator and will be held stationary thereby when the shell is being filled with flour or when the device is being employed as a scoop only and not required as a sifter. This is an important feature of the invention and adds materially to its efficiency, as it effectually prevents the agitator or its handle from ever becoming a hindrance to the usefulness of the device however it may be employed.

Forming the agitator of a single piece of wire, with the independent spaced hollow or looped wings, is also an important feature of the invention, as a very simple, effective, and cheap device is therefore produced, which combines extreme simplicity with lightness and durability.

The agitator may be made of any-sized wire, and as many of the spaced wings may be employed as required, but generally three will be sufficient, as shown.

The bar 13 may be made of any required size, but will generally be of comparatively heavy tin set edgewise and with the upper edge preferably rolled over to increase its transverse strength and attached by its ends to the interior of the shell either by soldering or riveting, or under some circumstances the bar may be detachably connected to the shell.

Having thus described my invention, what I claim is—

In a sifter, a cylindrical shell having a sieve-bottom, a bar disposed transversely of said shell near the bottom thereof and provided with a socket disposed centrally of the shell, and an agitator revolubly mounted in said shell between the planes of the bottom and the bar, and having one end thereof disposed vertically to engage said socket, and also having a scraper-arm arranged in contact with the walls of the shell.

In testimony that I claim the foregoing as my own I have hereto affixed my signature in the presence of two witnesses.

WILLIAM T. VALLANDINGHAM.

Witnesses:
P. E. VALLANDINGHAM,
KATIE MERANDA.